May 5, 1936.　　　J. W. MEINHARDT　　　2,039,971
BASKET
Filed Feb. 4, 1935　　　2 Sheets-Sheet 1

INVENTOR
J. W. MEINHARDT
BY　*E. E. Huffman*
ATTY

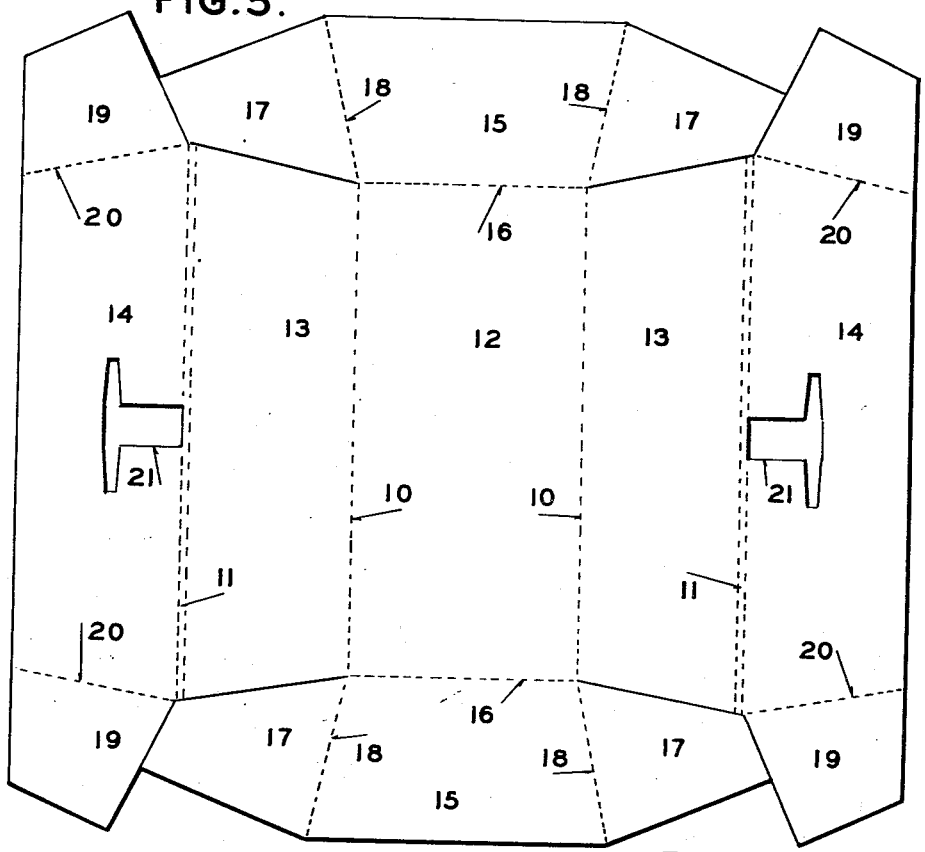

Patented May 5, 1936

2,039,971

UNITED STATES PATENT OFFICE 2,039,971

BASKET

John W. Meinhardt, St. Louis, Mo., assignor to St. Louis Basket & Box Corporation, St. Louis, Mo., a corporation of Delaware Application February 4, 1935, Serial No. 4,750

7 Claims. (Cl. 229—52)

My invention relates to a basket and particularly to a basket formed of bendable sheet material such as fiberboard, either solid or corrugated, and adapted for storing and shipping fruit or the like.

The object of my invention is to produce a basket of the type referred to which will be strong and rigid, simple in construction, and which may be assembled from its component parts without the use of tools, such as stitching or stapling machinery, and hence may be shipped in knockdown condition to fruit growers or others without skill in basket construction.

Figure 1:
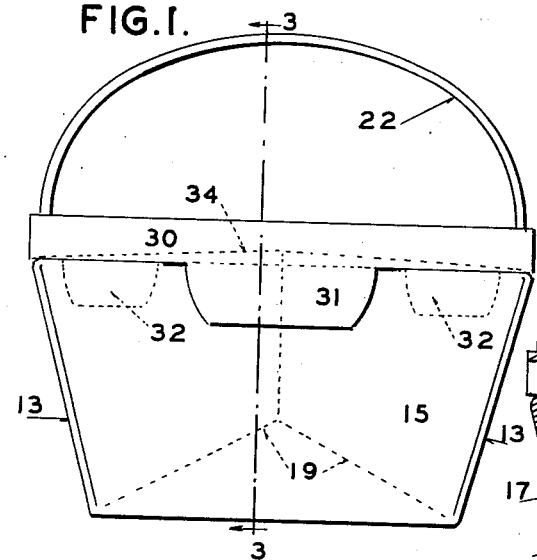
Figure 2:
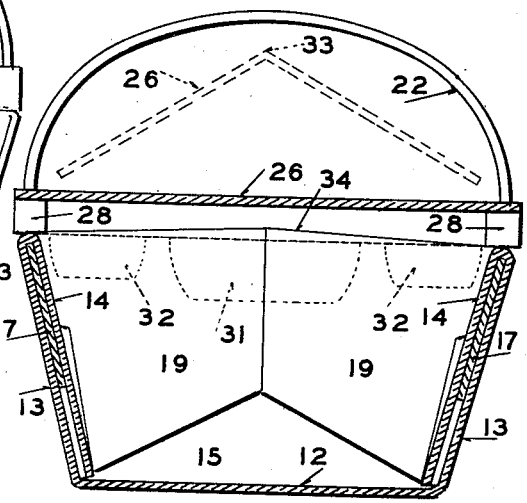
Figure 3:
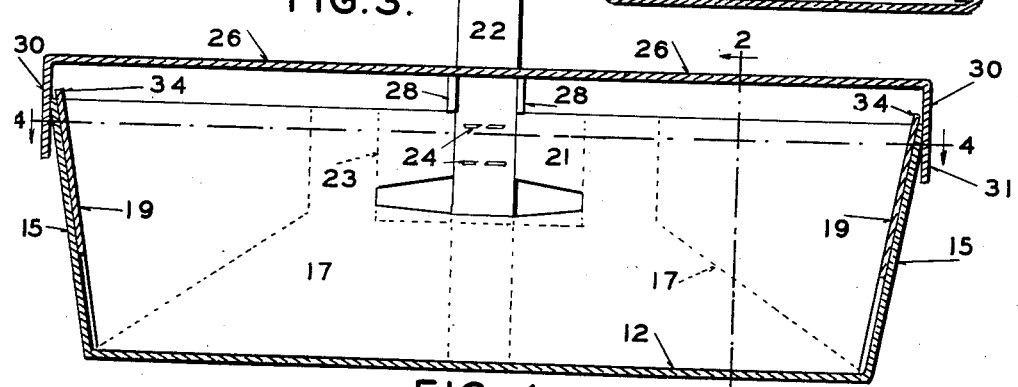
Figure 4:
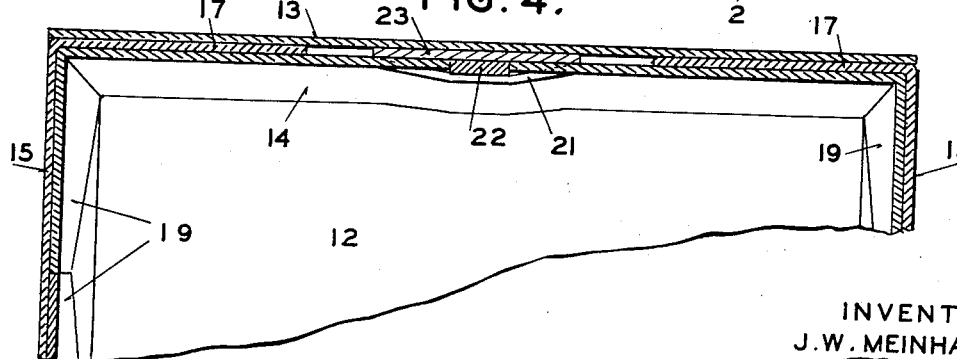

In the accompanying drawings, which illustrate one form of basket made in accordance with my invention, Figure 1 is an end view; Figure 2 is a cross-section taken on the line 2—2 of Figure 3; Figure 3 is a longitudinal section taken on the line 3—3 of Figure 1; Figure 4 is a horizontal section through one side of the basket, taken on the line 4—4 of Figure 3, the cover being removed; Figure 5 is a plan view of the blank from which the body of the basket is formed; Figure 6 is a plan view of the blank from which the basket cover is formed; and Figure 7 is a perspective view of one end of the handle.

Referring first to Figure 5, the body of the basket is formed from an approximately rectangular sheet of material, such as fiberboard, shaped as shown in this figure. The central portion of the blank is divided by single crease lines 10 and double crease lines 11 into a bottom panel 12, a pair of side panels 13 and a pair of side liners 14. Carried by the bottom panel 12 are a pair of end panels 15 adapted to be bent upwardly at approximately right-angles to the bottom panel along crease lines 16. Formed integral with each of the panels 15 are a pair of flaps 17 adapted to be bent over at approximately right-angles to the end panels along crease lines 18. Carried by each of the side liners 14 are a pair of end liners 19 adapted to be bent at approximately right-angles to the side liners along crease lines 20. Formed in each of the side liners is a T-shaped slot 21 extending from the double crease line 11 to about the center of the liner. The handle 22, which is preferably formed of wood, is of the usual arched form and is provided at each end with a crosspiece 23 secured thereto by any suitable means, such as staples 24. The width of the handle 22 is equal to the width of the stem of the T-slot 21; the length of the cross-piece is such that it will pass through the cross part of the T-slot; and the distance from the upper edge of the cross-piece to the bottom of the handle is equal to the depth of the side panel.

In assembling the basket the end panels 15 are first bent upwardly approximately at right-angles to the bottom panel, the flaps 17 being bent inwardly. The side panels 13 are now bent upwardly against the flaps and the side liners bent over parallel with the bottom panel. While the parts are in this position, the legs of the handle are passed down through the T-slots 21 until their lower ends contact with the bottom panel. The side liners are now folded down parallel with the side panels, enclosing not only the flaps 17 but also the cross-pieces 23 and the lower ends of the handle. Before the last-named operation is performed, the end liners 19 are bent upwardly so as to pass inside the basket and lie against the inner faces of the end panels where their inner edges are sprung into abutting engagement, as best shown in Figure 2, thus firmly locking the side liners in position against the enclosed parts and so holding all parts of the basket in position without the use of stitching, stapling or similar fastening means.

In the event the device is to be used as a tray, rather than as a basket, the handle may be omitted and it will be unnecessary to provide the side liners with T-slots.

The cover of the basket is formed of a blank like that shown in Figure 6 and consists of a substantially rectangular sheet of material having formed at its center a pair of transverse crease lines 25 spaced apart a distance equal to the width of the handle 22. These crease lines form hinges for the two sections 26 of the cover, which sections may be independently swung upwardly to uncover the contents of the basket. The space between these lines is provided at each end with a T-shaped cut 27 forming a pair of tabs 28 which, when bent downwardly, form slots for the reception of the handle. A second pair of transverse crease lines 29 are formed near the ends of the blank to provide spacing members 30. Carried by each spacing member is a central tab 31 and a pair of side tabs 32, the central tab being preferably slightly longer than the side tabs. The blank is also provided with a central longitudinal crease line 33.

In applying the cover to the basket the blank is first bent along the crease line 33 until it assumes the form shown in broken lines in Figure 2 when it may be passed through the handle until the slots formed by bending down tabs 28 register with the handle. The cover is now flattened out, as shown in full lines, to cause the notches to engage with the handle. The spacing members 30 are now bent downwardly, the center tabs 31 being allowed to pass outside the end panels, but the side tabs 32 being inserted between the end panels and the end liners 19. The latter operation is facilitated by the fact that the end liners extend slightly above the end panels to form a flange 34 against which the tabs 32 may be forced to separate the parts a sufficient distance to admit the tabs. The insertion of the tabs 32 between the end panels and the end liners provides effective frictional retaining means for the cover, and the spacing members 30 and tabs 28 space the cover from the upper edge of the basket to provide a ventilating opening along both sides thereof. The tabs 28 further form a supplemental brace for the handle to prevent its lateral movement.

Having fully described my invention, what I claim as new and desire to secure by Letters Patent of the United States is:

1. A container comprising a bottom panel, side panels carried by said bottom panel, end panels carried by said bottom panel, liners carried by said side panels and folded over approximately parallel therewith, flaps carried by said end panels and positioned between the side panels and their liners, and a pair of end liners carried by each side liner, the edges of said end liners abutting against each other to lock the side liners in position.

2. A container comprising a bottom panel, side panels carried by said bottom panel, end panels carried by said bottom panel, liners carried by said side panels and folded over approximately parallel therewith, each of said liners being provided with a slot, and a handle provided with cross pieces insertable through said slots, the cross pieces and the lower ends of the handle being clamped between the side panels and the liners.

3. A container comprising a bottom panel, side panels carried by said bottom panel, end panels carried by said bottom panel, liners carried by said side panels and folded over approximately parallel therewith, each of said liners being provided with a T-shaped slot, and a handle provided with cross pieces insertable through the cross parts of said slot, the body of the handle being engaged by the edges of the stem of the slot.

4. A container comprising a bottom panel, side and end panels, said end panels being composed of two-ply material unconnected at their upper edges, a handle carried by the side panels, a cover having slots adapted to engage said handle, spacing tabs adjacent the handle, spacing members at the ends of the cover, and tabs carried by the spacing members adapted to enter between the plies of material of the end panels.

5. A container comprising a bottom panel, side panels carried by said bottom panel, end panels carried by said bottom panel, liners carried by said side panels and folded over approximately parallel therewith, flaps carried by said end panels and positioned between the side panels and their liners, a pair of end liners carried by each side liner, a handle positioned between the side panels and side liners, a cover having slots engaging the handle, and tabs on said cover adapted to be inserted between the end panels and the end liners.

6. A container comprising a bottom panel, side panels carried by said bottom panel, end panels carried by said bottom panel, liners carried by said side panels and folded over approximately parallel therewith, flaps carried by said end panels and positioned between the side panels and their liners, a pair of end liners carried by each side liner, each side liner being provided with a T-shaped slot, a handle having cross pieces insertable through said slots, a cover having slots engaging said handle, and tabs carried by the cover and adapted to be inserted between the end panels and the end liners.

7. A container comprising a bottom panel, side and end panels, said end panels being composed of two-ply material unconnected at their upper edges, a handle carried by the side panels, a cover having slots adapted to engage said handle, said cover having a longitudinal crease to permit of its insertion into position and a pair of transverse creases adjacent the slots to form a pair of independently movable cover members, and tabs on the cover for insertion between the plies of material of the end panels.

JOHN W. MEINHARDT.

Disclaimer

2,039,971.—*John W. Meinhardt*, St. Louis, Mo. BASKET. Patent dated May 5, 1936. Disclaimer filed Apr. 17, 1950, by the assignee, *Gaylord Container Corporation*.

Hereby enters this disclaimer to claim 1 of said patent.

[*Official Gazette May 16, 1950.*]